Aug. 4, 1942.    M. E. LAKE ET AL    2,291,731
PRESSURE REGULATING SYSTEM
Filed Jan. 3, 1940
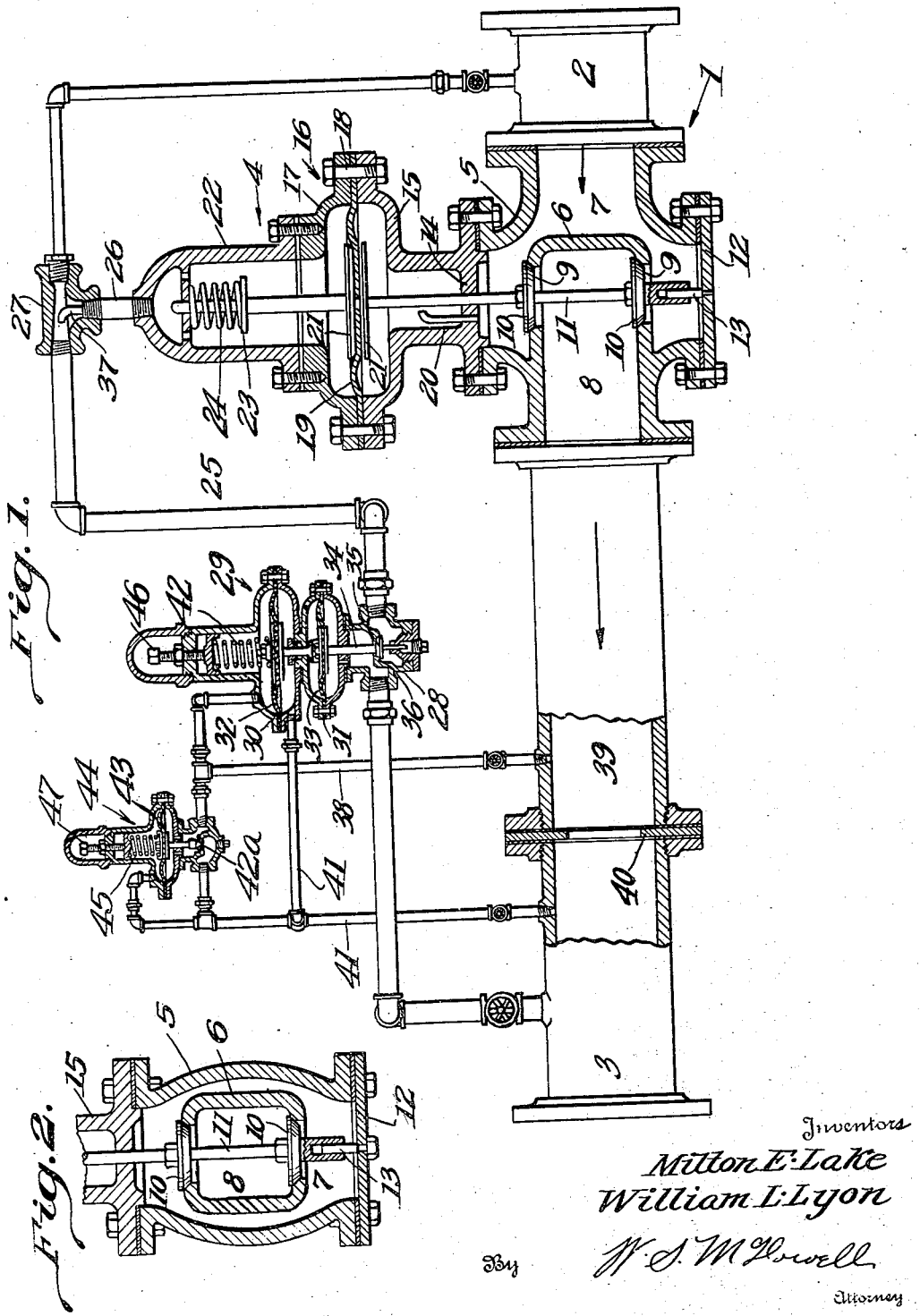
Inventors
Milton E. Lake
William L. Lyon
By W. S. McDowell
Attorney Patented Aug. 4, 1942

2,291,731

UNITED STATES PATENT OFFICE 2,291,731

PRESSURE REGULATING SYSTEM

Milton E. Lake and William Lewis Lyon, South Norwalk, Conn.

Application January 3, 1940, Serial No. 312,260

6 Claims. (Cl. 50—16)

This invention relates to improvement in fluid pressure regulating or reducing apparatus of the type generally employed in the control of gaseous fluids under superatmospheric pressures through supply lines and similar passages.

Regulators of this general type are widely used in the gas industry, among others, for the purpose of reducing pressure in distribution lines leading from main transmission lines. In the latter, it is essential to maintain relatively high pressures to have a constant supply available at all times and to insure the proper flow of the fluid through the lines at all times. As the demands are constantly changing, the pressures in the main lines vary from time to time. When the gas or similar fluid is introduced into the secondary or distributing systems, it is necessary that the fluid be maintained at a considerably lower and a substantially uniform pressure.

The primary object of this invention resides in the provision of a regulator for use between high and low pressure lines which will possess great sensitivity and will be operable to control the flow between the lines and maintain a predetermined reduced pressure, proportional to the volumetric flow, with a minimum amount of personal attention.

The present regulator is similar in construction and operation to that covered in my previous application which matured into Patent No. 2,059,121 for Pressure regulating system and dated October 27, 1936. To effect the operation of the regulator disclosed in the patent mentioned, a supplemental diaphragm regulator was employed in which a weight operated lever was utilized to move the valve of the regulator to an open position. This method of operation is undesirable since it is inflexible, hard to adjust, requires considerable attention and is not as sensitive to slight changes in pressure as has been found desirable.

Accordingly, in the present regulating system, the weighted lever type of actuator has been supplanted by a double diaphragm controller which is operated by spring pressure together with pressure differentials existing in the system and causes the actuation of the main regulator valves in direct relation to the volume of gas flow.

A further object resides in providing the regulating system with an orifice plate positioned in the low pressure line in slightly spaced relation from the main valves, the orifice plate causing the formation of a zone in which intermediate pressures obtain and with which one of the chambers of the double diaphragm controller communicates to render the system more responsive to variations in pressure in the low pressure line.

To give the system still greater control in response to pressure changes, it is proposed to position a booster limit valve in a shunt line extending around the orifice plate, the valve being operative to limit the pressure by causing the closing of the secondary regulator with which it is connected when a predetermined maximum pressure setting is reached.

Through the use of the present regulator, a uniform predetermined outlet pressure will be maintained at minimum load periods and the pressure will be automatically increased with relation to volume or rate of flow increase on the distribution systems, and manual pressure boosting during peak load periods and reduction in pressure at minimum demand periods will be eliminated, resulting in greater efficiency and consequent savings.

It is also an object of the invention to provide a pair of main valves between the high and low pressure lines and to connect these valves with a diaphragm which is responsive to differences in fluid pressures to effect the operation of the valves, spring means being provided to close the valve when the pressures on either side of the diaphragm are equal, a by-pass line being extended around the main valves and communicating with one side of the main diaphragm, and a secondary or booster regulator, of the double diaphragm type, being provided in the by-pass line to control gas flow therethrough in response to the pressure changes in the low pressure line, fluid flow through the by-pass line causing a differential in pressure on the sides of the main diaphragm and operating the main valves.

The system is also modified by providing an orifice plate in the low pressure line to create an intermediate pressure zone on the outlet side of the main valves, one side of each of the diaphragms of the secondary regulator being acted upon by the pressure in the line on the discharge side of the orifice plate and the other side of at least one of the diaphragms being engaged by the gas under the intermediate pressure at the inlet side of the orifice plate whereby the flow of gas into the low pressure line will be, in part, controlled in response to differential pressures existing on the upstream and downstream side of the orifice plate.

Other objects will be made apparent by the following description and the accompanying drawing in which the invention has been illustrated in one of its preferred forms.

In the drawing:

Fig. 1 is a diagrammatic view of the pressure regulating system comprising the present invention;

Fig. 2 is a vertical transverse sectional view taken through the main valves of the regulator on the plane indicated by the line II—II of Fig. 1.

Referring more particularly to the drawing, the numeral 1 designates the regulating system in its entirety. This system is disposed between a high pressure line 2 and a low pressure or distributing line 3. The system includes a main regulator 4 having a valve casing 5 connected at its inlet end with the line 2 and at its outlet with the distributing line 3. The casing 5 is provided internally with a U-shaped wall 6 which serves to divide the casing into inlet and outlet chambers 7 and 8. The horizontal portions of the wall 6 are formed with aligned openings 9 which are adapted to be closed by the main valves 10. These members are carried by a stem 11 guided for vertical movement in the casing 5.

The lower end of the casing is closed by a removable plate 12 having an upwardly extending pin 13 receivable within a socket formed in the lower end of the stem 11. This pin constitutes the guide at the lower end of the stem. The upper portion of the stem extends through the bottom wall 14 of the lower section 15 of a diaphragm housing 16, the upper portion 17 of this housing being secured to the lower portion by bolts 18 passing through laterally extending flanges formed on the meeting ends of the housing sections. A flexible fabric diaphragm 19 is clamped between the flanges of the housing sections and extends across the housing dividing it into a pair of chambers, the lower of which is in communication with the high pressure line through a short tube 20 extending through the wall 14.

The central portion of the diaphragm 19 is provided with an opening through which the stem 11 extends, fluid flow through this opening being prevented by clamping plates 21 used in securing the stem 11 to the diaphragm. The upper end of the stem extends through a guide formed with the cap member 22 of the housing 16 and below this guide is provided with an enlargement 23 for engagement with the lower end of a coil spring 24. The upper end of this spring engages the guide of the cap member and exerts a downward pressure on the stem and valves to hold the latter members in engagement with seats formed around the openings 9 to prevent flow from the high pressure into the low pressure line.

While the pressure is equal on opposite sides of the diaphragm 19, the spring 24 will hold the valves 10 in engagement with the seats and fluid flow through the valves will be prevented. To keep this pressure uniform, a by-pass line 25 extends from the high pressure line around the primary regulator to the low pressure line. Communication between this by-pass line and the upper chamber of the housing 16 is established through a short pipe section 26 extending from a T-fitting 27 disposed in the by-pass line and the cap member 22. Through the provision of this by-pass line, gas will flow from the high pressure line 2 through the by-pass line to the fitting 27 and through the pipe section 26 into the cap 22 and the spring 24 will then be free to move the valves 10 to a closed position where they will be maintained.

Between the fitting 27 and the low pressure line, the by-pass line is provided with a valve 28 forming a part of a secondary or booster regulator 29. This member includes a pair of diaphragm housings 30 and 31 which are divided into pressure chambers by horizontally disposed diaphragms 32 and 33. The latter diaphragm is connected by a rod 34 with a disk valve 35 arranged to close a port in a dividing wall 36 provided in the valve 28. When the valve 35 is in engagement with the seat formed in the wall 36, fluid flow through the by-pass line is precluded and the pressures above and below the diaphragm 19 will be equal. When the valve 35 is moved away from the wall 36, the fluid will flow through the by-pass line and as it passes through a restricted venturi formed in the connection 27, it will flow past the end of a small tube 37 joined with the pipe section 26 and toward the outlet of the connection 27 to induce a flow of gas from the upper chamber of the housing 16. The flow from this chamber will reduce the pressure therein and since the pressure in the lower chamber of the housing 16 is the same as in the high pressure line, the diaphragm 19 will be moved upwardly in opposition to the spring 24 and the valves 10 lifted from their seats to permit flow from the high to the low pressure line.

To effect the operation of the valve 35, the chambers below the diaphragms 32 and 33 are connected with the low pressure line, while the chamber above diaphragm 33 is open to atmospheric pressure through a vent or breather opening provided in the housing 31. The chamber above diaphragm 32 is connected by a pipe line 38 with an intermediate pressure zone 39 formed by positioning an orifice plate 40 in the line 3 between the outlet side of the main valve and the point in the line 3 where the by-pass line is connected therewith. By reason of the orifice plate, the pressure on the inlet side thereof will be slightly greater than that in the low pressure line while there is a flow of gas through the system.

At minimum or low load periods, the pressures above and below diaphragm 32 will be substantially equal and the mechanical force of a spring 42 disposed above the upper diaphragm 32 will be counteracted by the pressure in the outlet line transmitted to the underside of diaphragm 33 and the valve 35 maintained in a closed position.

When a demand is made for gas in the low pressure line, the pressure will fall slightly and this reduced pressure will be transmitted by the by-pass line and pipe 41 to the chambers below the diaphragms of the secondary regulator at which time these diaphragms will flex downwardly and permit the coil spring 42 to move the diaphragms and stems connecting these diaphragms with the valve 35 downwardly, moving the valve 35 to an open position to permit the flow of gas through the by-pass line.

It will be noted, at this time, that at the time the rate of flow increases in pipe 3, a pressure difference proportional to the rate of flow will exist on opposite sides of the orifice plate and will be applied to the upper and lower sides of the diaphragm 32 through the lines 38 and 41. Since the lower pressure obtains on the side opposite that receiving spring pressure, the opening movement of the valve 35 will be in proportion to the rate of fluid flow from the main supply pipe to the delivery pipe.

As stated previously, the flow through by-pass line 25 from line 2 reduces the pressure above the diaphragm 19 and permits the main valves to move to an open position when the gas will flow from the high pressure line into the zone 39. This gas will then pass through the orifice plate into the low pressure line and when the demand thereon has been satisfied, the pressure will be built up sufficiently to move the diaphragms 32 and 33 upwardly to cause the valve 35 to engage its seat and discontinue the flow of fluid through the line 25. When this flow stops, the pressures on the opposite sides of diaphragm 19 will become equalized and the spring 24 will then move the valves 10 to a closed position.

To make this regulator still more sensitive, a booster limit valve 42a has been provided. This valve is arranged between the lines 38 and 41 and is operated by a small diaphragm 43 provided in the housing 44. A coil spring 45 normally holds this valve in a closed position when the pressures on opposite sides of the diaphragm are substantially equal. When, however, the pressure in the intermediate chamber 39 rises to a predetermined maximum, this pressure will be transmitted through the line 38 into the inlet side of the valve 42a and to the underside of the diaphragm 43. As diaphragm 43 has a combined mechanical force and pressure force applied on the upper diaphragm tending to move it toward a position of valve closure, valve 42a will not lift from its seat and allow flow to by-pass from line 38 to line 41 until the fluid pressure from the intermediate zone 39 equals or slightly exceeds the combined mechanical and pressure forces directed toward a valve closure of diaphragm 43. Due to the area of this diaphragm, a predetermined pressure in zone 39 will cause it to move upwardly, in opposition to the pressure applied by spring 45 and the fluid thereabove and the valve 42a, being connected with the diaphragm, will be moved to an open position permitting fluid flow from the line 38 to the line 41. Since the line 38 communicates with the chamber at the upper side of one of the diaphragms of the secondary regulator, the pressure in this chamber will be maintained at a predetermined maximum.

As the pressure in line 3 builds up and is applied to the under sides of diaphragms 32 and 33, the force developed by the combined areas of these diaphragms is sufficient to overcome the pressure of the spring 42 and the fluid above diaphragm 32 and the valve 35 will then be moved to a closed position to effect the closing of the main valves 10 as above described.

As soon as the gas flow from the high pressure to the low pressure line has been discontinued, the pressures on opposite sides of the diaphragm 43 will be equalized and spring 45 will then again move the valve 42a to a closed position.

The responsiveness of the diaphragms which operate valves 35 and 42a may be varied by means of adjusting screws 46 and 47 carried by the upper ends of the housings 30 and 44. By adjusting the screw 47, the boost limit valve may be set to permit the maximum pressure desired at peak load periods.

The operation of the system is as follows: Assuming the pressure in the line 3 to be at the predetermined level, the mechanism will be in the position shown in Fig. 1 in the drawing. When a demand is made on the line 3, the pressure therein will be lowered and this reduced pressure will be transmitted by the line 41 and the by-pass line to the chambers below the diaphragms of the secondary regulator. This reduced pressure will permit the diaphragms to flex downwardly and the valve 35 will thereby be moved to an open position permitting the gas to flow through the by-pass line from the high pressure line 2. This flow will induce a flow from above the diaphragm 19 of the main regulator section and a differential in pressure will be produced on opposite sides of this diaphragm.

Since the higher pressure is below the diaphragm, it will flex upwardly drawing with it the valves 10 to move them away from the ports 9. At this time, gas will flow through the main valve into the chamber between the orifice plate and the outlet of the main valve. Because of the restriction provided by the orifice plate, the pressure will be built up in the chamber 39 and this elevated pressure will be transmitted by the pipe 38 to the under side of the diaphragm 43 causing it to move upwardly and open valve 42a whereby line 38 will be connected with the low pressure line and the pressure above the diaphragm 32 will be held substantially constant. Continued flow into the line 3 will increase the pressure therein which will be transmitted to the chambers below the diaphragms of the secondary regulator, and as the diaphragms 32 and 33 are of considerably greater area than the single diaphragm exposed to the pressure of the intermediate zone 39 through line 38, these diaphragms will be flexed upwardly and the valve 35 moved to a position wherein gas flow through the by-pass line will be reduced.

At this time, the pressures on opposite sides of the main diaphragm 19 will be equalized and spring 24 will again move valves 10 to closed positions to discontinue flow from the high pressure line into the chamber 39. When the pressure again falls in line 3, the above cycle will be repeated.

When a flow exists above a predetermined minimum rate from main supply pipe 2 to discharge pipe 3, a differential pressure will exist between the upstream and downstream sides of the orifice plate disposed in pipe 3 and these pressure differences will be in proportion to the volume or rate of flow. Pressure from the upstream side of the orifice restriction is transmitted through pipe 38 and through connecting pipes into the chambers above diaphragm 32 on the secondary booster regulator and below diaphragm 43 on the boost limit valve controller, while the pressure at the downstream side of the orifice restriction is transmitted to pipe 41 and connecting pipes to the under side of diaphragm 32 in the secondary booster regulator and to the upper side of diaphragm 43 on the booster valve controller.

When the flow through orifice restriction 40 is less than the predetermined minimum rate, very little or no pressure difference will exist between the upstream and downstream sides of the orifice restriction and the pressure above and below diaphragm 32 in the secondary booster regulator, and above and below diaphragm 43 in the booster valve controller will be substantially equalized and consequently boost limit valve will be in its normal closed position due to the mechanical force applied to the under structure of diaphragm 33 in the secondary booster regulator. When flow above a predetermined minimum exists from main supply line 2 to outlet or distribution line 3, the pressure differentials at the upstream and downstream sides of the orifice plate transmitted to the upper and lower sides of diaphragm 32 will set up a valve operating force directly related to the rate of flow or pressure differential between the upstream and downstream side of the orifice restriction. As the differential pressure changes, the forces applied on diaphragm 32 will change accordingly and as a result of these forces, the secondary regulator will become a booster regulator, inasmuch as the pressure force applied toward the valve opening in the secondary regulator will increase with a direct relation to an increase in flow through the orifice restriction disposed in pipe 3. While the spring 42 opposed by the force of outlet pressure is adjusted to maintain a fixed pressure at low demand or minimum volume periods, diaphragm 32 applies a valve controlling force automatically, in addition to spring 42 and diaphragm 33, which force increases correspondingly with an increase in rate of flow. In a like manner, as the rate of flow or volume decreases, the force applied by the application of pressure differentials to control valve 35 will be decreased in proportion to the decrease in rate of flow or volume.

What is claimed is:

1. Automatic pressure regulating apparatus comprising a primary regulator valve, a high pressure line leading to said valve, a low pressure line extending from said valve, an orifice plate disposed in said low pressure line and forming an intermediate pressure zone at the outlet side of said valve, a by-pass line extending around said valve and intermediate pressure zone from said high pressure to said low pressure line, a spring pressed secondary regulator valve positioned in said by-pass line, a diaphragm housing provided with said primary regulator, a diaphragm dividing said housing into constant and variable pressure chambers, said diaphragm being connected with said primary regulator valve, means establishing communication between the by-pass line and the variable pressure chamber of said diaphragm housing, diaphragm housing means provided with said secondary valve, a plurality of diaphragm members dividing said diaphragm housing means into sets of separate chambers, means establishing communication between corresponding chambers of said secondary diaphragm housing and said low pressure line, a shunt line extending from said intermediate pressure zone to said low pressure line, a normally closed valve in said line, diaphragm means responsive to pressures in said intermediate pressure zone to open said shunt line valve, and a line extending from said shunt line to a chamber of said secondary diaphragm housing opposite that receiving fluid under pressure from said low pressure line.

2. Automatic pressure regulating apparatus comprising a normally closed primary regulator valve, a high pressure line leading to said valve, a low pressure line extending from said valve, an orifice plate disposed in said low pressure line and forming an intermediate pressure zone at the outlet of said valve, a diaphragm housing provided with said valve, a diaphragm supported in said housing and connected with said valve, said diaphragm dividing said housing into constant and variable pressure chambers, a by-pass line extending around said valve from the high to the low pressure line, means establishing communication between said by-pass line and the variable pressure chamber in said housing, a secondary regulator valve for controlling the flow of fluid through said by-pass line, means for controlling the operation of said secondary regulator valve comprising housing means provided with said secondary valve, spring means tending to move said valve to an open position, a plurality of diaphragms connected with said valve and dividing said housing means into separate sets of fluid pressure chambers, means for introducing fluid under the pressure of said low pressure line to certain pressure chambers of said sets to move said diaphragms in opposition to said spring means, a shunt line extending from said intermediate pressure zone to said low pressure line, means establishing communication between said shunt line and an opposite pressure chamber of said secondary regulator, and limit valve means for controlling fluid flow through said shunt line, said valve means being moved to an open position by the elevation of pressure in said intermediate pressure zone to permit fluid flow through said shunt line and a stabilization in pressure in the secondary regulator chamber connected therewith.

3. Automatic pressure regulating apparatus comprising a normally closed primary regulator valve, a high pressure line leading to said valve, a low pressure line extending from said valve, an orifice plate disposed in said low pressure line and forming an intermediate pressure zone at the outlet of said valve, a diaphragm housing provided with said valve, a diaphragm supported in said housing and connected with said valve, said diaphragm dividing said housing into constant and variable chambers, a by-pass line extending around said valve from the high to the low pressure line, means establishing communication between said by-pass line and the variable pressure chamber in said housing, a secondary regulator valve for controlling the flow of fluid through said by-pass line, means for controlling the operation of said secondary regulator valve comprising housing means provided with said secondary valve, spring means tending to move said valve to an open position, a plurality of diaphragms connected with said valve and dividing said housing means into spaced sets of pressure chambers, means for introducing fluid under the pressure of said low pressure line to corresponding chambers of said sets to move said diaphragms in opposition to said springs, a shunt line extending from said intermediate pressure zone to said low pressure line, means establishing communication between said shunt line and a chamber of said secondary regulator opposite that receiving pressure from said low pressure line, limit valve means for controlling fluid flow through said shunt line, said valve means being moved to an open position by the elevation of pressure in said intermediate pressure zone to permit fluid flow through said shunt line and a stabilization of pressure in the secondary regulator chamber connected therewith, and means for varying the responsiveness of the secondary and limit valve means.

4. Automatic pressure regulating apparatus comprising a primary regulator valve, a high pressure line leading to said valve, a low pressure line extending from said valve, an orifice plate disposed in said low pressure line and forming an intermediate pressure zone at the outlet side of said valve, a by-pass line extending around said valve and intermediate pressure zone from said high pressure to said low pressure line, secondary valve means disposed in said by-pass line, diaphragm means having uniform and variable pressure sides connected with said primary valve, means for introducing fluid from said high pressure line to the uniform pressure side of said diaphragm means, means for conducting fluid from said by-pass line to the variable pressure side of said diaphragm, fluid flow through said by-pass line causing a flow of fluid from the variable pressure side of the diaphragm to the by-pass line, means for controlling the operation of the secondary valve means having a second diaphragm connected with said valve means, means for introducing fluid from said low pressure line to one side of said second diaphragm and from said intermediate pressure zone to the second side thereof, spring means for applying pressure to the latter side of said diaphragm, means for stabilizing the fluid pressure on the second side of said second diaphragm, said means having a fluid line extending between the second side of said second diaphragm and the low pressure line, a normally closed valve in said fluid line, and diaphragm means responsive to predetermined positive pressure differences in said intermediate pressure zone relative to said low pressure line to effect the opening of said normally closed valve.

5. Automatic pressure regulating apparatus comprising a diaphragm operated main valve, high and low pressure lines extending to and from said valve respectively, means in said low pressure line for establishing an intermediate pressure zone adjacent to the outlet of said main valve, a by-pass line extending around said valve from said high to said low pressure zone, fluid flow through said by-pass line causing the opening of said main valve, a secondary diaphragm valve disposed in said by-pass line to control fluid flow therethrough, said valve being operated by pressure differentials existing between the intermediate and low pressure zones, and pressure limiting means cooperating with said secondary diaphragm valve to stabilize the operation thereof, said limiting means having a spring-pressed diaphragm valve, one side of the diaphragm of said valve being subjected to the pressure of said intermediate zone and the other side to the pressure in said low pressure line.

6. Automatic pressure regulating apparatus comprising a main valve, high and low pressure lines extending to and from said valve respectively, means in said low pressure line for establishing an intermediate pressure zone adjacent to the outlet of said main valve, a housing arranged adjacent to said main valve, a diaphragm positioned in said housing to divide the same into high and variable pressure chambers, the former being in direct communication with said high pressure line, said diaphragm being connected with said main valve, a by-pass line extending from said high to said low pressure line, means establishing communication between said by-pass line and said variable pressure chamber, valve means in said by-pass line between the connections thereof with said variable pressure chamber and said low pressure line, diaphragm means connected with the valve in said by-pass line, conduit means for establishing communication between said intermediate pressure zone and one side of said last-mentioned diaphragm means whereby the valve connected therewith will be moved to an open position upon an increase in pressure in said intermediate pressure zone, additional valve means for establishing and shutting off communication between said conduit means and said low pressure line, diaphragm means responsive to increased pressure in said intermediate zone to effect the opening of said additional valve means, and means for conducting fluid under the pressure of said low pressure line to said last-mentioned diaphragm to oppose the force of intermediate pressure zone fluid thereon.

MILTON E. LAKE.
WILLIAM LEWIS LYON.